Aug. 3, 1943.   C. SEIPPEL   2,326,072
GAS TURBINE PLANT
Filed June 8, 1940   2 Sheets-Sheet 1

Aug. 3, 1943.  C. SEIPPEL  2,326,072
GAS TURBINE PLANT
Filed June 8, 1940  2 Sheets-Sheet 2

Inventor:
Claude Seippel
By Potter, Pierce & Scheffler,
Attorneys.

Patented Aug. 3, 1943

2,326,072

UNITED STATES PATENT OFFICE 2,326,072

GAS TURBINE PLANT

Claude Seippel, Ennetbaden, Switzerland, assignor to Aktiengesellschaft Brown, Boveri & Cie, Baden, Switzerland, a joint-stock company Application June 8, 1940, Serial No. 339,569
In Germany June 28, 1939

7 Claims. (Cl. 60—41)

This invention relates to gas turbine plants of the type including an axial flow compressor for supplying combustion air and cooling air, a combustion chamber or chambers in which fuel is burned under constant pressure, and a turbine operated by the combustion gases to drive the compressor and develop useful power. The turbine assemblies contemplated by the invention may be used for various purposes but are particularly adapted for use on aeroplanes or other high-speed craft.

The constant-pressure combustion type of turbine plant has usually been constructed in large sizes for the purpose of increasing the fuel efficiency, i. e. the ratio of power output to fuel input. The overall efficiency depends upon the efficiency of the compressor and also upon friction and other energy losses arising from the flow of the air and motive gases through the various supply and discharge passages. These losses rose to prohibitive values when attempts were made to construct relatively small and light-weight turbine plants according to the general designs of larger turbine plants and, in general, the efficiency of prior constant pressure gas turbines has decreased so rapidly with a decrease in the useful power output that it has been impossible or impractical to construct combustion gas turbines with a useful output of the order of a few hundred horsepower.

An object of the present invention is to provide constant pressure gas turbines of simple construction and light weight that operate with high efficiency. An object is to provide gas turbines in which an axial flow compressor, a combustion chamber and a turbine are axially alined and designed, so far as is consistent with the air compressing and motive gas expanding actions, for an approximately axial flow of air and motive gases, without turbulence and sharp changes in direction or speed. More specifically, objects are to provide gas turbines of the stated axially alined construction in which the blade angles of the compressor and the turbine are designed to decrease the axial air speed towards the outlet of the compressor and to increase the axial speed of the motive gases towards the discharge end of the turbine. A further object is to provide a turbine plant of the stated axially alined type in which an annular space between the compressor outlet and the turbine inlet is subdivided into a number of mixing chambers and passages for cooling air, the mixing chambers and air passages being alternately arranged circumferentially and all discharging into the annular inlet to the turbine.

These and other objects and advantages of the invention will be apparent from the following specification when taken with the accompanying drawings in which:

Fig. 2a is a schematic developed view of parts of the compressor and turbine blading;

Figure 2:
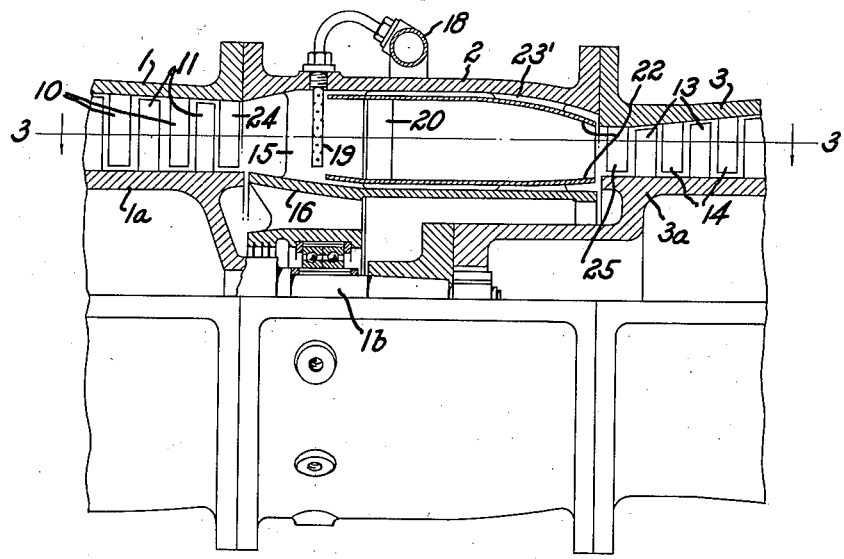
Fig. 2 is a similar but fragmentary view on a larger scale of the combustion chamber and adjacent sections of the compressor and turbine.
Figure 3:
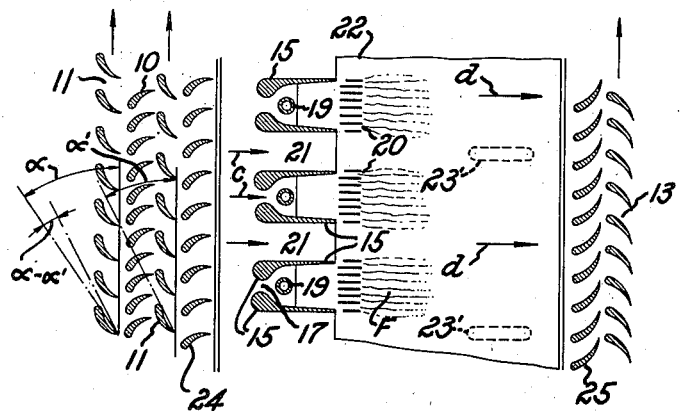

Fig. 3 is a fragmentary development of the parts shown in Fig. 2, as seen on a section taken on a cylindrical surface passing through line 3—3 of Fig. 2; and Fig. 4 is a fragmentary development of a modified construction in which the guide vanes at the compressor outlet and turbine inlet are eliminated by constructions that establish a spiral flow of the gases in the annular space between the compressor and turbine.

In the drawings, the reference numeral 1 identifies the forward or compressor section of an approximately cylindrical casing which includes a combustion chamber section 2 and a rear turbine section 3. The casing may be formed, as shown, by two similar sections that meet at the horizontal plane through the axis of the compressor and turbine, with brackets 4 on the lower section for mounting the power plant on a suitable framework or support. The rotor elements 1a, 3a of the compressor and turbine, respectively, are coaxial and secured to each other in any desired manner, as by mounting upon a common shaft or by keying the turbine rotor 3a to the hub 1b of the compressor. In the case of a drive for a high speed vehicle the compressor rotor 1a or its supporting shaft is coupled by a step-down gearing 6 to the propeller 7.

The compressor air intake 8 opens in the direction of vehicle travel and the annular turbine outlet 9 discharges the exhaust gases against the direction of travel. In this particular use of the novel turbine plant, the flow of air to the compressor is initiated by the propeller 7 and the rearward discharge of the exhaust gases contributes power for the propulsion of the vehicle. The general direction of flow of air and combustion gases through the turbine plant is axial, but with some radial components incident to the compression of the air in transit through the casing section 1 and the expansion of the motive gases that pass through the casing section 3.

The design requirements of a compact assembly necessitate a high operating speed and a high axial flow component of the air and motive gases, but complete combustion of the fuel in a combustion chamber of reasonable length imposes the limitation that the air velocity at the combustion chamber be below a definite value. In accordance with the invention, the compressor blades are constructed to discharge the air at a relatively low velocity, and the fuel mixing chambers have restricted inlets to obtain a further reduction of the air velocity. Diffusers or baffles for reducing the air velocity are impractical, or at least undesirable, in view of the accompanying energy losses.

Figure 1:
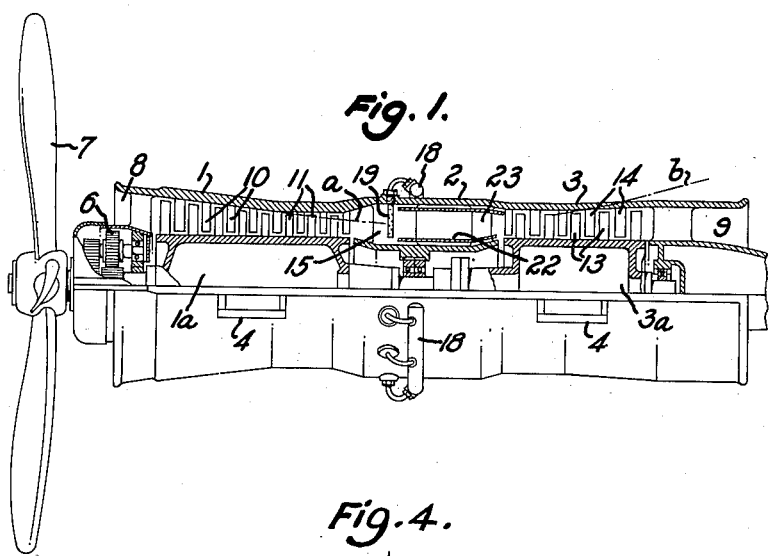
Fig. 1 is a side elevation, with some parts shown in longitudinal central section, of a turbine plant driving a propeller, the turbine plant being an embodiment of the invention and designed to employ the exhaust gas impulse for forward propulsion.

It has been the practice to decrease the length of the blades of a multistage axial flow compressor progressively towards the outlet of the compressor and, in the usual case of a cylindrical rotor element the inner wall of the compressor casing has been conical, as indicated by the broken line $a$ in Fig. 1, and the inclination of the blades has been the same for all stages. A multistage compressor of this design is characterized by a progressive increase in the air velocity at the discharge sides of the several stages. This increase in air velocity is objectionable and, according to this invention, one or more of the adjacent stages are designed to reduce or eliminate the velocity increase through a decrease in the inclination, and a corresponding increase in the length, of the blades of the higher pressure stage or stages. In the illustrated embodiment, the initial stages are of the increasing air velocity type and the forward end of the compressor casing 1 has a conical surface that tapers to conform to the line $a$, and only the last three stages are designed to prevent a further rise in the air velocity. The rear portion of the compressor casing therefore does not conform to the conical surface indicated by line $a$ but lies outside of that surface to reduce the velocity of the air stream delivered to the combustion zone.

The customary turbine design calls for a progressive increase in the length of the blades towards the exhaust end of a multistage turbine, the increase in blade length being attained with a cylindrical rotor by flaring the casing wall outwardly along the line $b$ of Fig. 1. This progressive reduction in the velocity of the motive gases is desirable in stationary turbine plants to reduce the exhaust gas losses to a minimum, but the exhaust gas energy may be employed to advantage in the case of high speed vehicle propulsion by discharging the exhaust gases against the direction of vehicle travel at velocities of from 1.2 to 1.5 times the vehicle speed. These high gas velocities are obtained by using the same or approximately the same length of moving blades 13 and stationary blades 14 in all stages, and increasing the angle of blades in successive stages. The outer wall 3 of the turbine casing therefore has a substantially less flare than that of prior turbines with a constant blade angle and lengths that varied as indicated by line $b$.

The quantity of air delivered by the compressor is substantially greater than that required for complete combustion of the fuel as the temperature resulting from combustion of fuel without an excess of air would rapidly destroy the walls of the combustion zone and the initial stages of the turbine. The total quantity of air may be from 3 to 5 times that required for complete combustion, but only a part of the air flows through a series of circumferentially spaced mixing chambers that are formed by radial walls 15 that extend inwardly from the casing wall 2 to an inner approximately cylindrical wall 16. The forward edges of the walls 15 are thickened to leave radially extending slots that constitute relatively narrow inlet openings 17, thereby reducing the velocity of the air flow through the mixing chambers. Fuel is supplied to the mixing chambers from a manifold 18 through perforated pipes 19, and the fuel may be a highly volatile liquid fuel that is injected in fine streams through small holes in the pipes 19, or it may be the vapors of a residue-free oil that is heated to a high temperature in any desired manner. The inlet openings 17 are so dimensioned that a rich easily ignitable fuel mixture is formed in the mixing chambers, and combustion takes place within and beyond the "grates" that comprise a series of plates 20 at the outlet end of each mixing chamber. The length of the plates in the direction of gas flow, and the spacing of the plates, are such that frictional resistance reduces the velocity of the combustible mixture, in the boundary layers that contact the plates, to less than the velocity of flame propagation. Small sheets of flame therefore play along the surfaces of the plates 20 to preheat the rapidly flowing main body of the mixture and to ignite it when its velocity is reduced as it leaves the plates. This construction insures a stable flame that will not be blown out or quenched by any changes in air velocity or fuel feed that may occur during normal operation of the turbine plant.

The flame streams F thus formed at the exit side of the plates 20 are cooled by the streams of air that flow through the passages 21 between the mixing chambers. These streams supply any secondary air that is required for complete combustion, and a large volume of cooling air that mixes with and reduces the temperature of the combustion gases before they reach the first set of turbine blades. The casing walls 2, 16 of the combustion chamber section are protected by plates 22 of highly heat-resistant metal or alloys that are supported on the radial walls 15 of the mixing chamber and a rearward set of radial walls 23, Fig. 1, or ribs 23' on the walls 2, 16, Fig. 2. Some of the cooling air flows between the plates 22 and the walls 3, 16.

The inclinations $\alpha$ and $\alpha'$ of the last two sets of moving blades 11 of the compressor are indicated in Fig. 3, and the decreased angle of the blades towards the compressor outlet contributes to the low axial air velocity that is required to obtain good fuel mixtures and stable combustion. The walls 15 of the mixing chambers are axial in the construction shown in Figs. 2 and 3, and a set of guide vanes 24 are arranged at the exit of the compressor to convert the helical travel of the air leaving the last compressor blades 11 into an axial flow, as indicated by the arrows $c$. The mixture of combustion gases and cooling air flows out of the annular combustion chamber axially, as indicated by the arrow $d$, and through the stator ring of guide vanes 25 that impart a radial component to the motive gases as they reach the first ring of moving blades 13 of the turbine.

The guide vanes 24 may be omitted by arranging the walls 15' of the mixing chambers as helical surfaces extending in the direction OC of the air stream leaving the last row of compressor blades 11, see Fig. 4. In the vector diagram, OB represents the velocity of the blades 11 and AO represents the velocity of the air stream entering the blades 11. The air flows into the mixing chambers and through the passages 21' along helical paths indicated by the arrows c'. The guide ring at the entrance to the first turbine runner may be replaced by streamlined reinforcing and guide ribs 23 that direct the motive gases in the helical direction indicated by the arrow d'. Vector BO' indicates the velocity of the turbine blades 13 and vector GO' the velocity of the motive gases at the entrance to the blades. The resulting vector O'G' shows the direction of flow of the motive gases with respect to the turbine blades.

It is to be understood that the invention is not restricted to the constructions herein shown and described, and that various changes may be made without departing from the spirit of the invention as set forth in the following claims.

I claim:

1. A gas turbine for driving generators, propellers and the like, comprising a multistage axial flow turbine and a direct driven multistage axial flow compressor, a combustion chamber of annular cross-section between the compressor and the gas turbine, the annular inlet to said chamber coaxially adjoining the last blade row of said compressor and the outlet from said chamber coaxially adjoining the first blade row of the gas turbine, walls arranged radially in the entrance end of the combustion chamber and circumferentially spaced to form a plurality of mixing chambers and cooling air passages arranged in alternation circumferentially at the entrance side of said combustion chamber, and means for supplying fuel to each mixing chamber.

2. A gas turbine for driving generators, propellers and the like, comprising a multistage axial flow turbine and a direct driven multistage axial flow compressor, a combustion chamber of annular cross-section between the compressor and the gas turbine, the inlet to said chamber coaxially adjoining the last blade row of said compressor and the outlet from said chamber coaxially adjoining the first blade row of the gas turbine, circumferentially spaced walls arranged radially in the entrance end of the combustion chamber to form a plurality of alternately arranged mixing chambers and cooling air passages, means for supplying fuel to each mixing chamber, and a plurality of circumferentially spaced plates at the outlet of each mixing chamber to stabilize the flame.

3. A gas turbine comprising a multistage axial flow turbine coaxial with and directly driving a multistage axial flow compressor, a combustion chamber of annular cross-section having an annular inlet coaxially adjoining the last blade row of said compressor and an annular outlet coaxially adjoining the first blade row of the gas turbine, the blade angles of stages of the compressor decreasing towards the outlet end thereof to decrease the axial velocity of the compressed air stream entering the annular inlet of said chamber, means including circumferentially spaced radial walls at the entrance end of said chamber defining a plurality of mixing chambers with restricted inlet openings and circumferentially spaced by cooling air passages, and means for supplying fuel to the mixing chambers.

4. A gas turbine comprising a multistage axial flow turbine coaxial with and directly driving a multistage axial flow compressor, an annular combustion chamber coaxial with and directly connecting the outlet end of the compressor to the inlet end of said turbine, a plurality of mixing chambers at the entrance end of said combustion chamber and circumferentially spaced by cooling air passages, said mixing chambers being formed by spaced radial walls with thickened forward edges that approach each other to provide restricted inlet openings, whereby the velocity of air flow through the mixing chambers is less than the entrance velocity, and means for supplying fuel to the mixing chambers, the blade angles of stages of the compressor decreasing towards the outlet end thereof to decrease the axial velocity of the compressed air stream.

5. A gas turbine as claimed in claim 4, wherein said annular combustion chamber has inner and outer concentric casing walls, and coaxial heat-resistant metal plates are spaced from said casing walls to form an annular space within which the fuel mixture is burned, the forward edges of said plates being spaced from the walls for the entrance of cooling air between the plates and the adjacent casing walls.

6. A gas turbine comprising a multistage axial flow turbine, a multistage axial flow compressor coaxial with and directly connected to said turbine, an annular combustion chamber between and directly connecting the compressor outlet with the turbine inlet, means for supplying to said combustion chamber a quantity of fuel that will be completely consumed by a fraction of the air delivered by said compressor, whereby the major portion of the compressor output dilutes the combustion gases to form a motive gas of relatively low temperature, and means including radially extending walls forming a plurality of mixing chambers and of cooling air passages spaced circumferentially and in alternation at the entrance end of said combustion chamber, each mixing chamber having a narrow radially-extending inlet opening for receiving air from said compressor and said fuel supplying means including pipes discharging in line with said inlet openings for supplying fuel to each mixing chamber.

7. A gas turbine as claimed in claim 6, wherein each mixing chamber is defined by walls parallel to the axis of the compressor and turbine, and the last blade ring of the compressor comprises guide blades for establishing an axial flow of the air stream leaving the compressor.

CLAUDE SEIPPEL.